Aug. 22, 1939.  P. J. MESSER  2,170,504
WINCH
Filed Oct. 11, 1937   5 Sheets-Sheet 1

Inventor
Peter J. Messer
By Geo. A. Tew
Attorneys

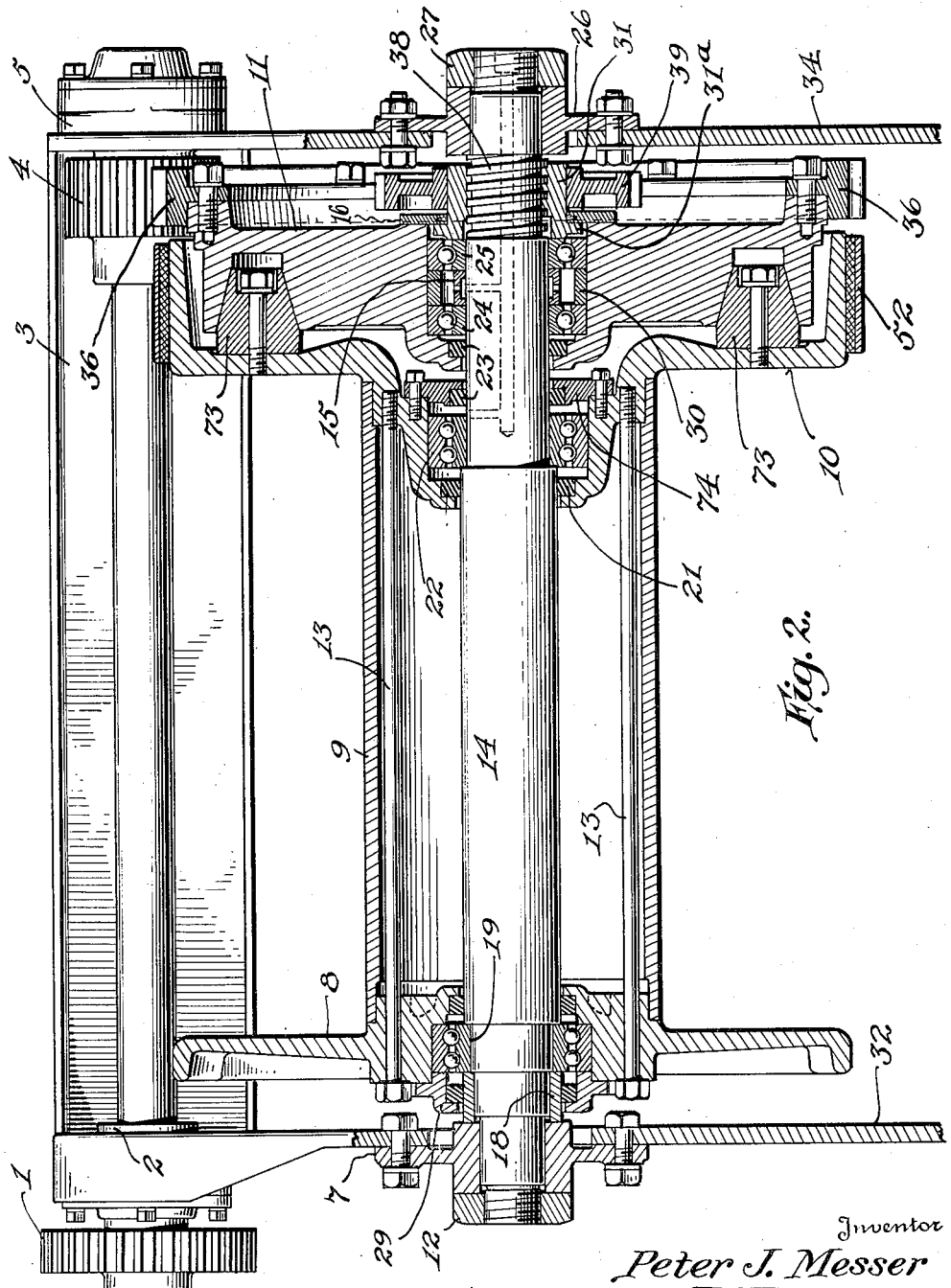

Aug. 22, 1939.  P. J. MESSER  2,170,504
WINCH
Filed Oct. 11, 1937   5 Sheets-Sheet 3

Inventor
Peter J. Messer

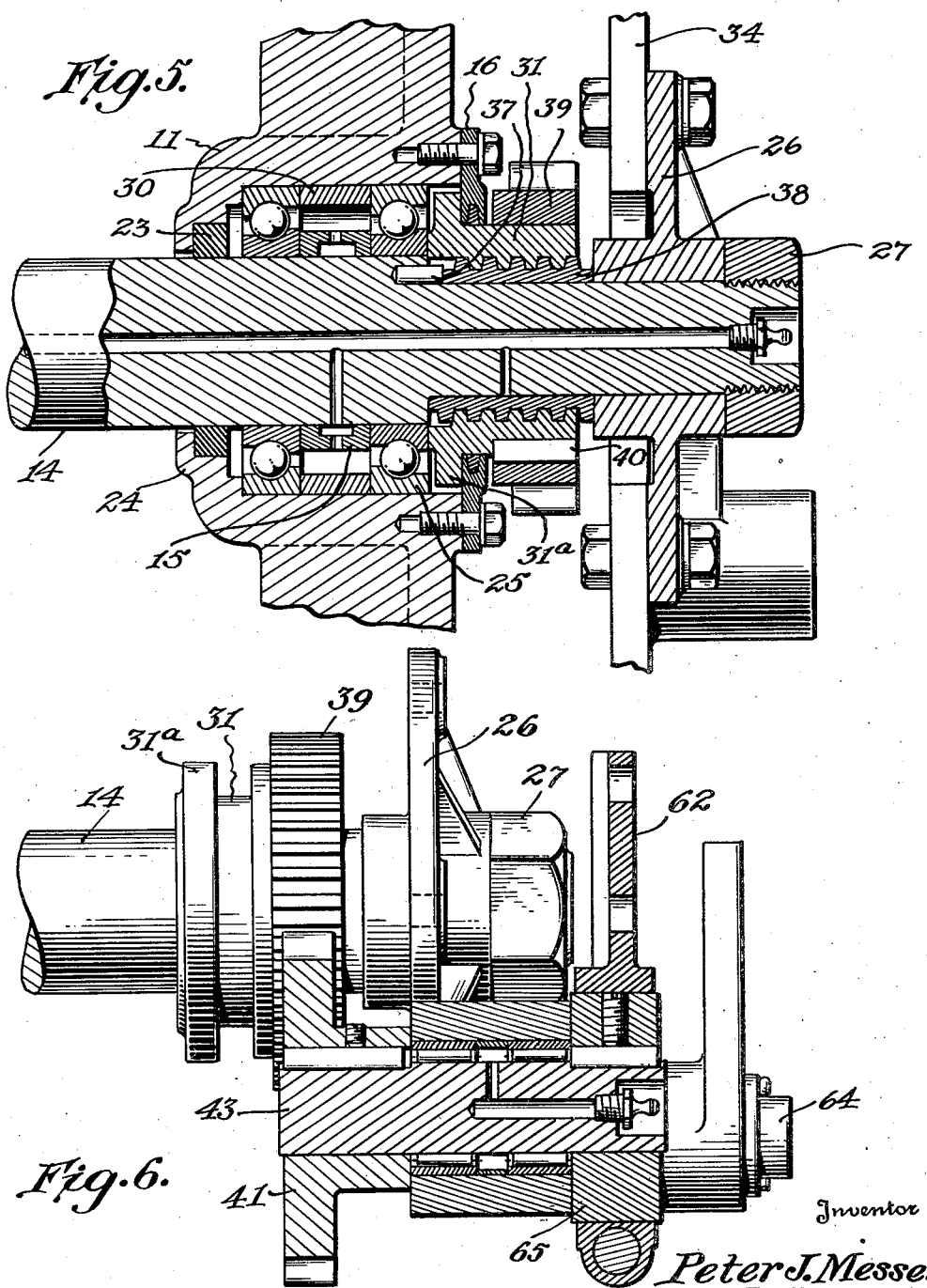

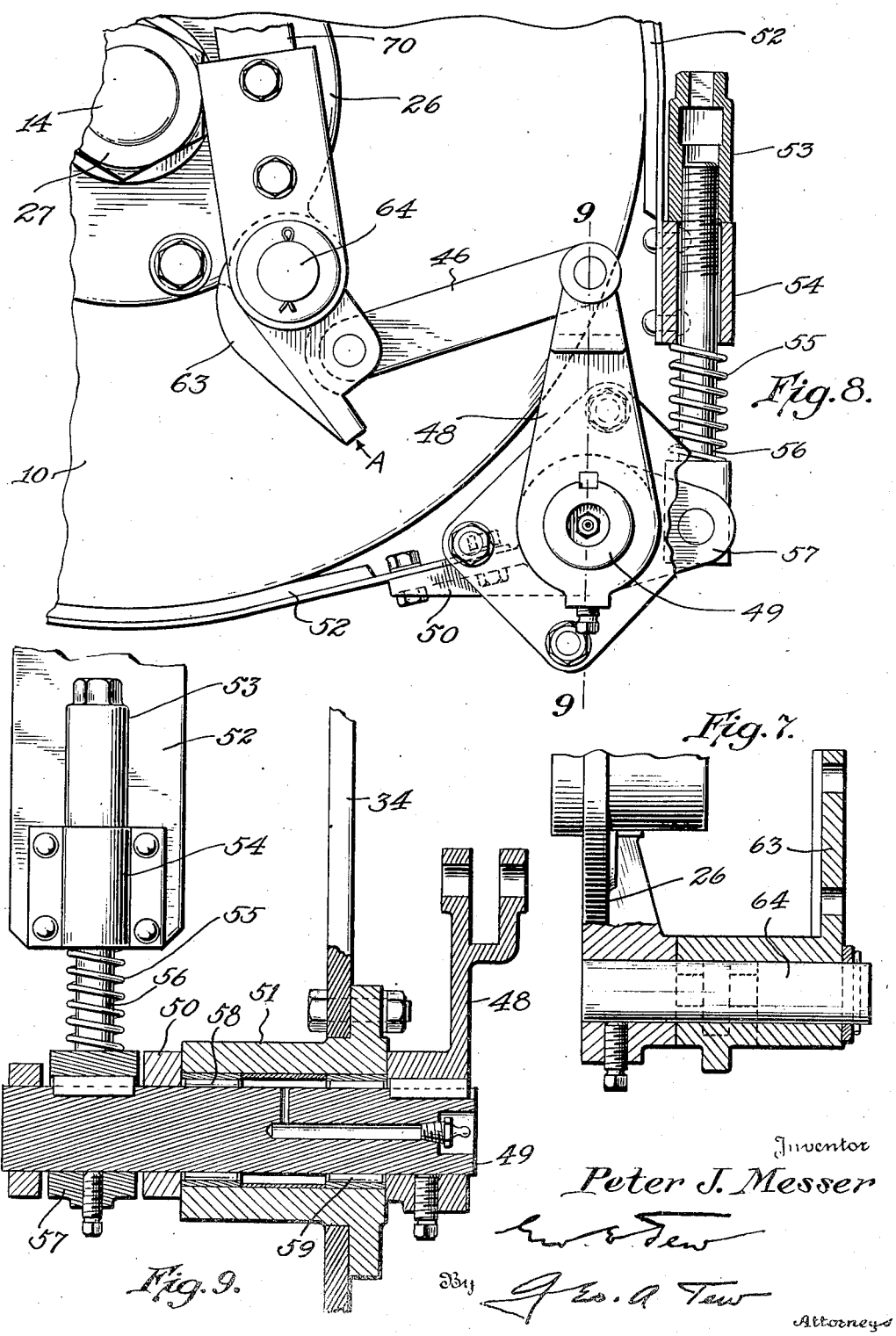

Patented Aug. 22, 1939

2,170,504

UNITED STATES PATENT OFFICE 2,170,504

WINCH

Peter J. Messer, Olean, N. Y., assignor to Luther Manufacturing Company, Inc., Olean, N. Y.

Application October 11, 1937, Serial No. 168,450

3 Claims. (Cl. 254—187)

This invention relates to winches, and is particularly applicable to a tractor mounted and tractor powered winch. The principal features of novelty are the clutch construction and its operation in connection with the winch spool or drum; also the brake construction and operation. Associated with this is a gear box mounted directly on top of the winch frame.

So far as known to me winches of the type referred to are made to force the spool or drum itself against the friction clutch member, making it necessary to slide the drum or spool endwise on its bearings. This type of construction has many disadvantages. One is that it is necessary at times to apply the brake before the clutch is released. To pull the spool free from the clutch, with a heavy line pull on the spool and the brake applied, it is sometimes almost impossible to stop the load near where it is intended. This heavy strain upon the clutch operating mechanism causes excessive wear and oftentimes breakage, the operator not being able to judge from the feel of the clutch operating lever, whether or not the clutch is released or dragging in the friction against the load. Also in moving such equipment up or down a hillside to a new location, a load of thousands of pounds is hanging on the winch spool. When the brake is set and it becomes necessary to move the load up the hill a short distance, the operator has to release the brake somewhat before he can operate the clutch to pick up the load and sometimes the load will start down hill and then when the clutch is applied a very heavy jolt is put on the line, causing it to break, with costly damages to the equipment and sometimes injury to the workmen. Also it often happens that when pulling the equipment, which is usually mounted on skids or the like, up a steep grade, the load will sometimes slide to one side or the other, which will cause the line to crowd heavily against the drum flange. If it happens to be the clutch side flange, it makes it almost impossible to release the clutch, or if it happens to be the other end flange the pressure against this flange will crowd the spool away from the clutch enough under a very heavy pull to cause the clutch to slip. Other objections also exist with the shifting spool type of winch. For example, in pulling rods and tubing, in which the whole string of tubing must be lifted from the full depth of the well for unscrewing the joints, the operation of raising and lowering the tubing makes it necessary that the operator have complete control of both the brake and the clutch on the winch. A sudden jolt in lowering the tubing may cause a joint of the tubing to break off somewhere down in the well, and a costly fishing job is the result. These and various other objections to the present type of which are corrected by the present invention, and the operator will have a desirable close control of the spool which is so necessary in many kinds of work.

By the present invention it is possible to hold the spool in a fixed position on its bearings. The clutch is free to operate independent of any line load or with any brake load on the spool, giving full control of the spool under all conditions. The brake can be set and then the clutch applied, after which the brake can be released to give an easy pick up of the load which is so essential for many kinds of work, and any side pull against the flanges of the spool cannot affect the working of the clutch. The clutch is applied by a threaded thrust nut on the drum shaft. It is necessary that they have a very close fit, because after considerable usage they both become worn, resulting in too much back lash, which affects the close control of the clutch. In the present invention the screw is made separate from the shaft, in the form of a sleeve held in place by a dowel and clamped by the spool flange. By doing this a new screw can be supplied when worn, instead of having to provide a whole new shaft which would be quite costly. The clutch operating lever is provided with a split yoke which can be loosened and moved to follow the wear on the clutch.

The brake operating assembly is improved for this type of winch construction. It does away with the long brake shaft which extends all the way through the winch which makes it impossible, due to interference of parts on the tractor, to place the brake in a position to get the best possible brake actuation. The present brake assembly is in one unit, which makes it possible to place and bolt it to the side frame of the winch, which makes it possible to get a closer mounting of the winch to the tractor, such a winch being usually applied to or mounted on the rear end of the tractor. This is important as it avoids excessive overhang which would affect the balance of the tractor. The brake is also provided with a locking device, so that by pulling the brake lever down as far as it is set to go, a link and cam passing over center will hold the brake set.

The gear box for driving the drum is mounted on top of the winch frame instead of on the back of the tractor, and may be driven by a chain or gear from a power take off at the back of the tractor. This type of mounting saves considerable overhanging weight.

One form of the invention is illustrated in the accompanying drawings in which—

Fig. 2 is a central vertical section of the winch spool and clutch assembly, parts being omitted.

Fig. 5 is a section on the line 5—5 of Fig. 4.

Fig. 6 is a section on the line 6—6 of Fig. 4.

Fig. 7 is a section on the line 7—7 of Fig. 4.

Fig. 8 is a detail in elevation of the brake operating device, and

Fig. 9 is a section on the line 9—9 of Fig. 8.

Figure 1:
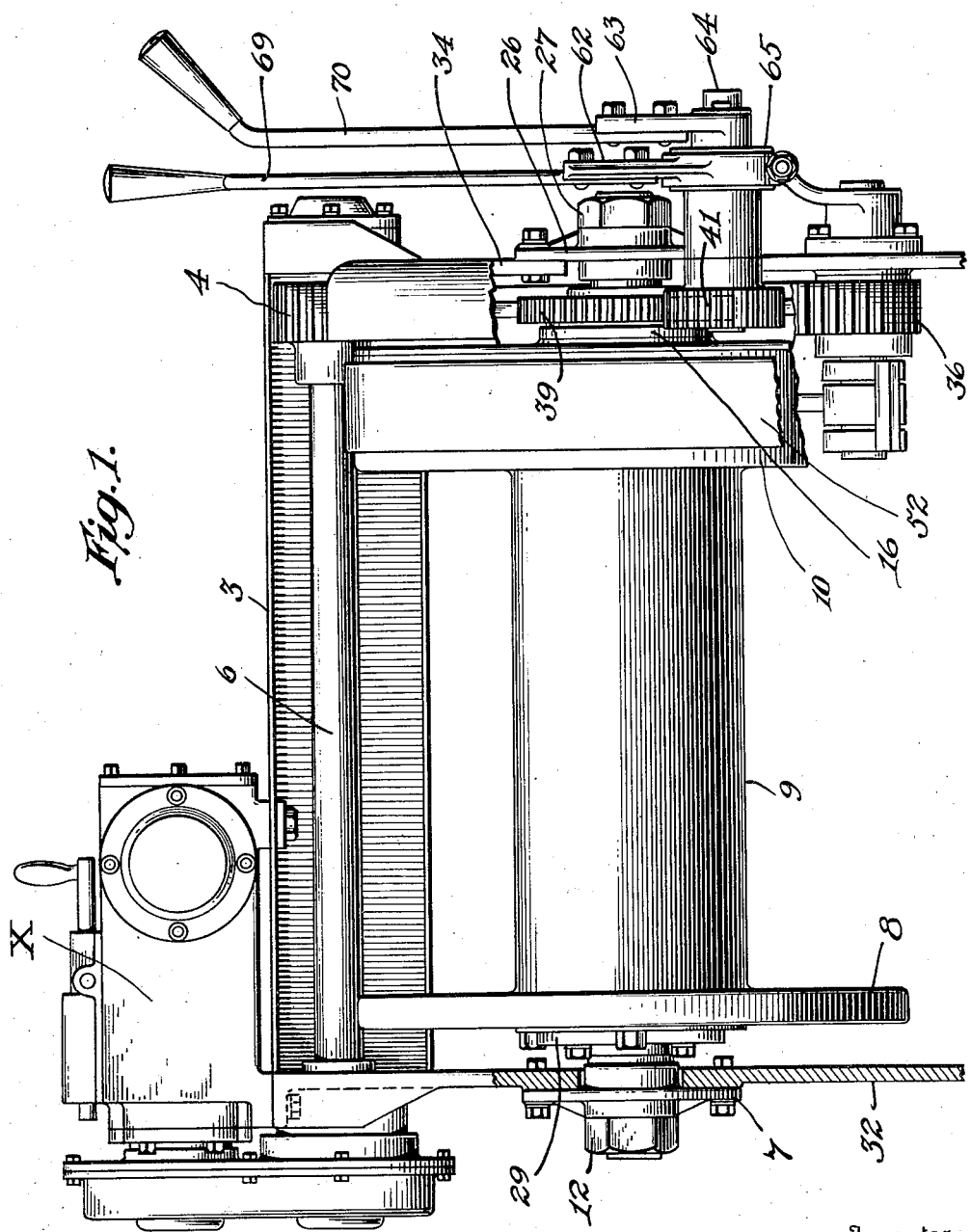
Fig. 1 is a rear elevation of the winch.

Referring particularly to the drawings X indicates a gear casing bolted on top of the cross piece 3 of the winch frame the side frames of which are indicated at 32 and 34 and support the parts to be described. The gear box X will house a change speed gear driven by suitable gear or chain belt connections to the power take off of the tractor not shown, the intake for a sprocket chain drive being indicated at 71. The gearing drives a gear 1 on the main drive shaft 6 which is mounted in bearings 2 and 5 bolted on the frame plates 32 and 34. On the shaft 6 is keyed the pinion 4 which meshes with large ring gear 36 from which the drum is driven through the clutch. The drum or spool comprises the end flange 8, the barrel 9 and the clutch and brake end flange 10, these parts being assembled and clamped together by the rods 13, and the barrel may be welded at its ends to the flanges 8 and 10.

The end flange 8 has a cage or recess for the radial and thrust bearing 19. A ring flange 29 clamps the outer race of the bearing 19 in the cage or recess, and sleeve 18 clamps the inner race of the bearing 19 against the shoulder of the spool shaft 14. A ring flange 7, mounted on the outer side of the frame 32 is forced against the sleeve 18 by a nut 12 on the end of the shaft 14. This assembly holds the bearing 19 fast to the shaft 14 and spool flange 8 on the bearing 19, which prevents the spool from moving endwise in either direction, and at the same time taking the thrust of the clutch at the other end.

The flange 10 has bolted thereto the tapered friction blocks 73, and the outer diameter is machined to form a drum for the brake band 52. The center of the flange 10 is recessed or cupped to form a cage for the radial bearing 22, on which the shaft 14 turns, and is enclosed by the ring flange 74. The bearing is sealed to hold oil by the seals 21 and 23.

The shiftable friction clutch plate or member 11 is grooved to receive the clutch blocks 73, and its outer diameter is fitted with the detachable ring gear 36 bolted thereto, so that it can be replaced when worn without replacing the friction plate. The hub of the friction plate is recessed to receive the radial thrust bearings 24 and 25 which can slide on the spool shaft 14. Spacers 15 and 30 hold the bearings in their proper place.

The clutch nut is indicated at 31 and its inner end turns against the inner race of the bearing 25 where it is held in position by a ring 16 bolted to the clutch plate and engaged behind a flange 31a at the inner end of the nut.

Figure 4:
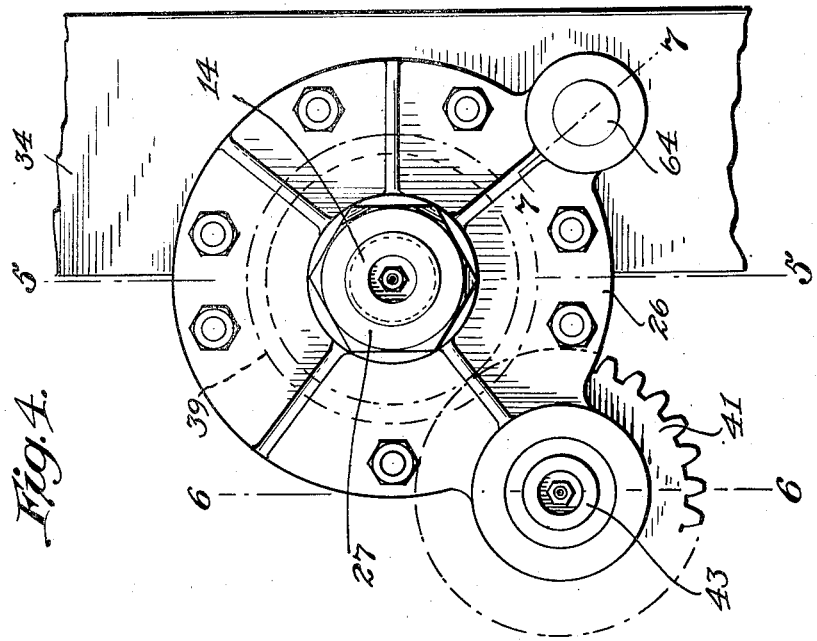
Fig. 4 is an elevation of the clutch operating assembly.

The clutch nut 31 engages and works on a screw sleeve 38, shown in detail in Fig. 5, the sleeve being doweled to the shaft 14 by the dowel 37 and clamped endwise by the ring flange 26 bolted to the frame 34 and the nut 27 on the end of the shaft 14. A gear 39 is keyed as at 40 to the outside of the clutch nut 31 and the nut is advanced or retracted on the screw to engage or disengage the clutch. The gear 39 meshes with an operating gear 41, see Fig. 4.

The gear 41 is keyed on shaft 43 (see Fig. 6) and on the outer end of shaft 43 is keyed a collar 65 onto which is clamped a clutch lever yoke 62 which can be slipped around to proper position for operating the clutch and for taking up the wear of the clutch. The clutch lever 69 is bolted to the yoke 62 and by operation of the lever the clutch is thrown in or out as above described.

Figure 3:
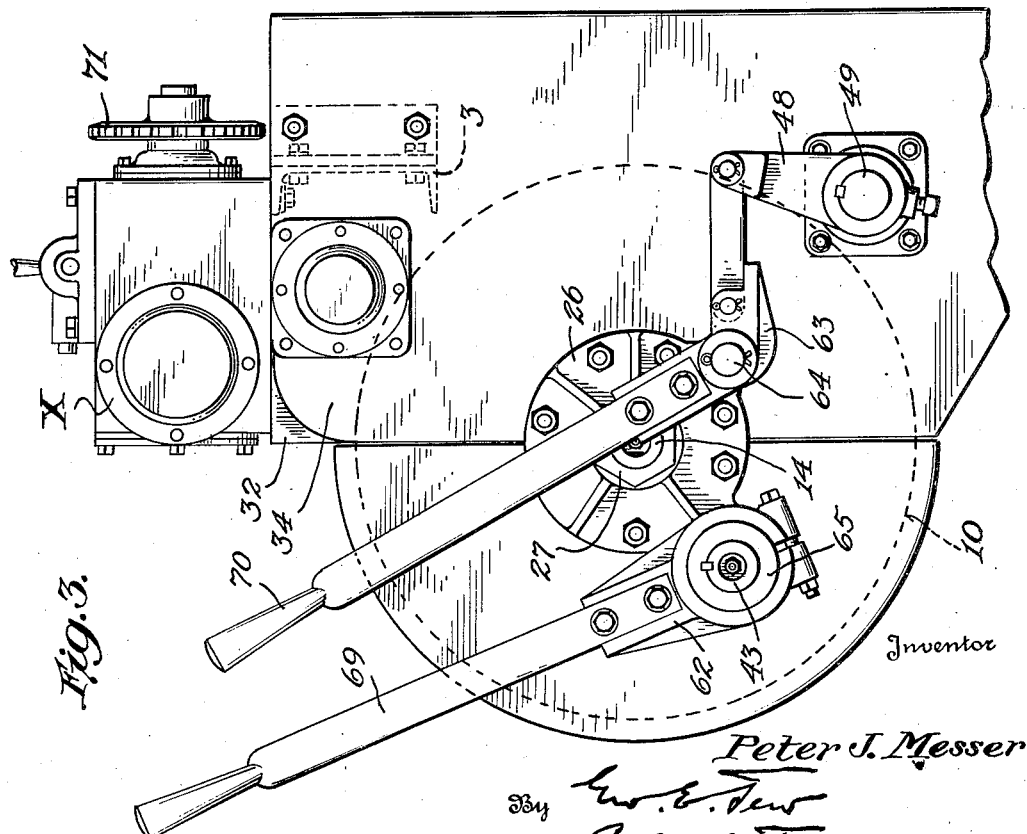
Fig. 3 is an end elevation of the winch, showing the operating levers at the right hand end.

For operating the brake band 52 a shaft or pivot pin 64 is fastened into a boss on the plate 26 and on this pivot is mounted the brake cam 63. On the end of a shaft 49 (see Fig. 9) and in line with the ends of the brake band 52 is keyed a cam or rocker arm 57; and a brake band hinge 50, connected to the end of the brake band is loose or free on the shaft. On the outer end of the shaft 49 is keyed an arm 48; and the shaft 49 is assembled in a bearing cage 51 bolted to the frame 34, and turns on quill bearings 58 and 59. A bolt 56 is pinned into the cam or rocker 57 and extends up through brake band lug 54 and into the adjusting nut 53, a spring 55 being spaced between the bolt shoulder and lug to lift the brake band free when released, and will also take up wear of the brake band. Into the free end of the brake shaft arm 48 is pivoted a link 46 pivoted at the other end to the cam 63 which is provided with a lip at A. This lip will stop against the link 46 after it has passed slightly beyond center, thereby causing the brake to remain set until the lever 63 is moved down again. The lever 63 is provided with an operating handle 70 in convenient position beside the clutch operating handle 69 as shown. The connection 50 which fits loosely on the shaft 49 is bolted to the dead end of the brake band 52, and the brake shaft cage 51 with the parts assembled is bolted onto the side plate 34. Fig. 8 shows the brake released and Fig. 3 shows the brake in locked position.

It will be seen that the drum is mounted on a shaft 14 against any endwise movement. The gear 36, driven by the shaft 6 and pinion 4 carries with it the shifting clutch member 11, and when this member is shifted in to engagement with the block 73 the drum will be friction driven. The clutch is shifted in or out by suitable manipulation of the lever 69 which as described is geared to the gear 39 on the nut 31 which thereby travels in or out on the screw 38 shifting the clutch plate into or out of engagement accordingly. The brake may be applied by the lever 70 through the means above described to contract the brake band, and it will be noted that both the brake and clutch levers are located for convenient operation and supported entirely by the end plate at one end of the winch frame, giving a very compact and convenient arrangement of parts and what might be called a very close construction which is highly desirable in winches of the type referred to, that is, those mounted on the rear end of a tractor and driven by a power take off therefrom. Obviously a platform type of winch would be very inconvenient for such a machine. By means of the present invention all the parts are supported in close relation by two side plates and a top cross piece bolted to the frame of the tractor.

I claim:

1. In a winch, the combination of a frame having end plates, a shaft fixed between said plates and having a screw at one end, a spool rotatable on the shaft and fixed against endwise movement thereon, said spool having one end flange provided with a hollow brake drum and a fixed friction clutch member within said drum, a cooperating shifting clutch member rotatably mounted on the shaft within said drum and provided with a ring gear, a nut on the screw, bearing against said shifting clutch member to operate the same, a lever pivoted on the adjacent end plate and operatively geared to the nut to turn the same, a brake band around the brake drum, and a lever pivoted on said end plate and operatively connected to the band.

2. In a winch, the combination of a fixed shaft, a spool rotatable on and fixed against endwise movement on said shaft, and provided at one end with a clutch member, a combined clutch member and ring gear rotatable and shiftable axially on the shaft to engage or disengage the clutch, the clutch member having a hollow hub, thrust and radial roller bearings housed in the hollow of the hub between the shiftable clutch member and the shaft, said bearings being bodily shiftable on the shaft with said clutch member, and a nut engaging threads on the shaft to shift said shifting clutch member and its said bearings, the nut being enclosed within said ring gear.

3. The combination stated in claim 2, the inner end of the nut abutting against said bearings and having a flange engaging the shifting clutch member.

PETER J. MESSER.